US012784454B2

(12) United States Patent
Kim et al.

(10) Patent No.: US 12,784,454 B2
(45) Date of Patent: Nov. 3, 2026

(54) VIDEO MANAGEMENT APPARATUS AND METHOD CAPABLE OF EDITING AND CUT EXTRACTING VIDEO

(71) Applicant: CRABs Co., Ltd., Seoul (KR)

(72) Inventors: Tae Young Kim, Seoul (KR); Do Gyeong Lee, Seoul (KR)

(73) Assignee: CRABs Co., Ltd., Seoul (KR)

( * ) Notice: Subject to any disclaimer, the term of this patent is extended or adjusted under 35 U.S.C. 154(b) by 121 days.

(21) Appl. No.: 18/944,186

(22) Filed: Nov. 12, 2024

(65) Prior Publication Data

US 2025/0336209 A1 Oct. 30, 2025

(30) Foreign Application Priority Data

Apr. 25, 2024 (KR) ........................ 10-2024-0055344
Aug. 29, 2024 (KR) ........................ 10-2024-0117221

(51) Int. Cl.

| | |
|---|---|
| ***G06V 20/40*** | (2022.01) |
| ***G06V 10/70*** | (2022.01) |
| ***G10L 15/26*** | (2006.01) |
| ***G10L 25/57*** | (2013.01) |

(52) U.S. Cl.

CPC .............. *G06V 20/46* (2022.01); *G06V 10/70* (2022.01); *G06V 20/41* (2022.01); *G06V 20/49* (2022.01); *G10L 15/26* (2013.01); *G10L 25/57* (2013.01)

(58) Field of Classification Search

CPC ........ G06V 20/46; G06V 10/70; G06V 20/41; G06V 20/49; G10L 15/26; G10L 25/57; G10L 15/02; H04N 21/44008; H04N 21/4394; G06T 7/246

See application file for complete search history.

(56) References Cited

U.S. PATENT DOCUMENTS

| | | | | |
|---|---|---|---|---|
| 5,999,173 A * | 12/1999 | Ubillos | ................ | G11B 27/034 |
| 9,361,353 B1 * | 6/2016 | Aristides | ............... | G06F 16/735 |
| 9,639,251 B2 * | 5/2017 | Lee | ....................... | G06F 16/685 |
| 11,983,923 B1 * | 5/2024 | Wang | ..................... | G06V 20/48 |

(Continued)

FOREIGN PATENT DOCUMENTS

| | | |
|---|---|---|
| CN | 112423138 A | 2/2021 |
| CN | 112685597 A | 4/2021 |

(Continued)

*Primary Examiner* — Xuemei G Chen

(74) *Attorney, Agent, or Firm* — Dinsmore & Shohl LLP; Yongsok Choi, Esq.

(57) ABSTRACT

A video editing and cut extraction apparatus includes a communication unit receiving an image from the outside, a scene extraction unit classifying and extracting scenes within the image, a first cut extraction unit classifying and extracting cuts based on a change in a pixel value or a change in the edge of an object in each frame within each extracted scene, a contents analysis unit analyzing the contents of the extracted scene, a script extraction unit extracting a script of one or more of the extracted scenes or one or more of the extracted cuts, an output unit outputting contents extracted or analyzed by the scene extraction unit, the first cut extraction unit, the contents analysis unit, and the script extraction unit in a lump, and a memory unit storing data received by the communication unit and information extracted or analyzed by each extraction unit or the contents analysis unit.

10 Claims, 13 Drawing Sheets

(56) References Cited

U.S. PATENT DOCUMENTS

| | | | | |
|---|---|---|---|---|
| 12,244,908 | B2 * | 3/2025 | Sivaswamy | G06Q 10/40 |
| 12,651,457 | B1 * | 6/2026 | Omar | G06V 20/41 |
| 2008/0141303 | A1 * | 6/2008 | Walker | H04N 21/4621 725/39 |
| 2011/0225136 | A1 | 9/2011 | Tu | |
| 2014/0149865 | A1 * | 5/2014 | Tanaka | G06F 16/70 715/719 |
| 2018/0075031 | A1 * | 3/2018 | Knee | G06F 16/51 |
| 2019/0289359 | A1 * | 9/2019 | Sekar | H04N 21/4333 |
| 2020/0404173 | A1 * | 12/2020 | Li | G06V 20/46 |
| 2021/0097646 | A1 * | 4/2021 | Choi | G06N 3/0442 |
| 2023/0343100 | A1 * | 10/2023 | Kadu | G06V 20/49 |
| 2023/0388438 | A1 * | 11/2023 | Yoshida | H04N 5/147 |
| 2024/0005960 | A1 * | 1/2024 | Murarka | G06T 7/00 |
| 2024/0029440 | A1 * | 1/2024 | So | G06V 20/52 |
| 2024/0127403 | A1 * | 4/2024 | Wu | G06T 5/50 |
| 2024/0138041 | A1 * | 4/2024 | Kim | H05B 45/20 |
| 2025/0024097 | A1 * | 1/2025 | Dong | H04N 21/8549 |
| 2025/0200282 | A1 * | 6/2025 | Kumar | G06F 40/284 |
| 2025/0272792 | A1 * | 8/2025 | Chou | G06T 5/50 |
| 2025/0316004 | A1 * | 10/2025 | Sena | G06T 11/60 |
| 2025/0336421 | A1 * | 10/2025 | Zweig | G11B 27/031 |

FOREIGN PATENT DOCUMENTS

| | | | |
|---|---|---|---|
| CN | 113128431 | A | 7/2021 |
| CN | 116521938 | A | 8/2023 |

* cited by examiner

FIG. 3A
| Group | Interval | Thumbnail(image) | Script |
|---|---|---|---|
| 1 | 0':00~0':43 | 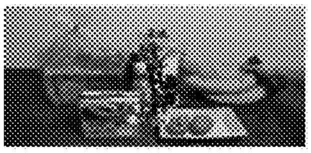 | Prepare bread, milk, bananas, butter, and eggs |
| 2 | 2':12~2':21 | 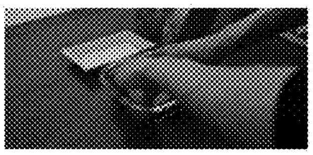 | Soak bread in egg wate |
FIG. 3B
| Group | Interval | Contents |
|---|---|---|
| 2 | 2':12~2':21 | There are white plates and silver plates on the table, and the man is soaking the bread in the egg water in the silver plates with his hands |

FIG. 5
CRABs
EDIT : AI Cut
View only ai cut
Clip to be included in final image : 5/182
Image preview

VIDEO MANAGEMENT APPARATUS AND METHOD CAPABLE OF EDITING AND CUT EXTRACTING VIDEO

CROSS-REFERENCE TO RELATED APPLICATION

This application claims priority to Korean Patent Application No. 10-2024-0055344, filed on Apr. 25, 2024 and Korean Patent Application No. 10-2024-0117221, filed on Aug. 29, 2024.

This patent is the results of research (a unique project number: 2370000098, a detailed project number: 00399433, a project name: Development of a video editing solution centered on K-pop artists: Customized multi-modal AI model and generative asset) that was carried out by the support of Korea Creative Content Agency (KOCCA) by the finances of the government of the Republic of Korea (Ministry of Culture, Sports and Tourism) in 2024.

BACKGROUND

1. Technical Field

The present embodiment relates to a video management apparatus and method capable of editing a received video, extracting a scene or cut within a video, and directly searching for the content of a video.

2. Related Art

Contents described in this part merely provide background information of the present embodiment, and do not constitute a conventional technology.

In the video editing and scene extraction field, the detection of a scene change is considered as a technically important task. A scene change is a decisive factor that divides the continuity of an image, and plays a key role in editing, summary, search, and search optimization processes.

Conventionally, there is a method of detecting a scene change based on a pixel. In this method, a change in the pixel value between consecutive frames of an image is analyzed. When a great change is detected, it is considered that a scene change has occurred. However, this method may cause an error because the method sensitively responds to a fine movement or an illumination change in a background.

Due to such a fatal problem, a method of detecting whether a scene has been changed based on a feature point has emerged. In this method, a feature point of an image, for example, texture is extracted, and a scene change is detected by analyzing a change of such a feature point. The method is effective in a complicated scene, but has disadvantages in that a calculation cost is high and a processing speed is slow.

The existing methods may be effective in a simple scene change, but are likely to cause an error due to various factors, such as the contents of a dynamic image, a complicated background, and a fast camera movement. In particular, the detection of a scene change in a low illuminance environment is very difficult. Furthermore, such methods are limited in view of a processing speed and efficiency in processing a large amount of image data in real time.

SUMMARY

An embodiment of the present disclosure is directed to providing a video content search apparatus and method capable of directly searching a video for contents with high accuracy and even with a small computational load.

Furthermore, an embodiment of the present disclosure is directed to providing an apparatus for editing a received video and relatively accurately extracting a scene or cut within a video.

According to an aspect of the present disclosure, a video management apparatus includes a communication unit configured to receive, from the outside, a video from which each of clips is to be extracted or the contents of which are to be analyzed and contents to be searched for within the video, a clip extraction unit configured to classify and extract the clips from the received video, a search unit configured to search the video received by the communication unit from the outside for contents to be searched for within the video within the video, and an output unit configured to output some of the clips or the clips extracted by the clip extraction unit in a lump.

According to an aspect of the present disclosure, the clip extraction unit classifies the received video in each frame unit, determines whether a change having a preset reference value or more has occurred in a pixel value or HSV (color, saturation, brightness) within each frame from which clips are extracted.

According to an aspect of the present disclosure, the clip extraction unit extracts a script of each of the extracted clips.

According to an aspect of the present disclosure, the clip extraction unit extracts the script by converting the extracted clips into an audio file and extracting text from the audio file.

According to an aspect of the present disclosure, the search unit searches for a clip having the highest similarity to the contents to be searched for with respect to each of the clip.

According to an aspect of the present disclosure, the search unit searches for a clip having similarity having a preset reference value or more to the contents to be searched for, with respect to each of the clips.

According to an aspect of the present disclosure, the search unit searches for the clip having the similarity to the contents to be searched by using a cosine similarity method.

According to an aspect of the present disclosure, the output unit highlights and outputs the clips retrieved by the search unit.

According to an aspect of the present disclosure, a video contents search method includes a reception process of receiving, from the outside, a video from which each of clips is to be extracted or the contents of which are to be analyzed and contents to be searched for within the video, an analysis process of analyzing whether a clip including the received contents is present in the contents of each of the clips within the video, and an output process of outputting the clips extracted from the video and highlighting the clip including the received contents.

According to an aspect of the present disclosure, the analysis process includes searching the contents of each clip within the video for a clip having the highest similarity or having similarity having a preset reference value or more.

According to an aspect of the present disclosure, a video management apparatus includes a communication unit configured to receive an image from the outside, a scene extraction unit configured to classify and extract scenes within the received image, a first cut extraction unit configured to classify and extract cuts based on a change in a pixel value or a change in the edge of an object in each frame within each of the scenes extracted by the scene extraction unit, a contents analysis unit configured to analyze the contents of the scene extracted by the scene extraction unit, a script extraction unit configured to extract a script of one or more of the scenes extracted by the scene extraction unit or one or more of the cuts extracted by the first cut extraction unit, an output unit configured to output contents extracted or analyzed by the scene extraction unit, the first cut extraction unit, the contents analysis unit, and the script extraction unit in a lump, and a memory unit configured to store data received by the communication unit and information extracted or analyzed by each of the scene extraction unit, the first cut extraction unit, and the script extraction unit or the contents analysis unit.

According to an aspect of the present disclosure, the scene extraction unit classifies the received image in each frame unit and classifies a background other than the object within each of the frames.

According to an aspect of the present disclosure, the scene extraction unit determines whether the scene has been changed based on whether a change having a preset reference value or more has occurred in a pixel value (RGB) or HSV (color, saturation, brightness) of the background between front and rear frames.

According to an aspect of the present disclosure, the video management apparatus further includes a second cut extraction unit configured to classify and extract the cuts based on a change in the contents of a dialogue within each scene.

According to an aspect of the present disclosure, the second cut extraction unit operates in parallel to the first cut extraction unit or operates selectively with respect to the first cut extraction unit.

According to an aspect of the present disclosure, the second cut extraction unit converts a voice within the image into text and recognizes the change in the contents of a dialogue within each of the scenes.

According to an aspect of the present disclosure, the second cut extraction unit recognizes that the contents of the dialogue have been changed when a sentence is concluded or a respiration of a speaker is stopped.

According to an aspect of the present disclosure, the contents analysis unit extracts each of arbitrary frames with respect to each of the cuts within each scene to be analyzed.

According to an aspect of the present disclosure, the contents analysis unit analyzes contents of an image with respect to the extracted frames by using an artificial intelligence learning model that analyzes an image.

According to an aspect of the present disclosure, the script extraction unit converts each of the extracted cuts into an audio file and extracts the script from the audio file.

As described above, according to an aspect of the present embodiment, it is possible to directly search for contents within a video with high accuracy and even with a small computational load.

Furthermore, according to an aspect of the present embodiment, it is possible to edit a received video and relatively accurately extract a scene or cut within a video.

BRIEF DESCRIPTION OF THE DRAWINGS

FIGS. 3A and 3B are diagrams illustrating an example of extraction by the clip extraction unit, an image extraction unit, and a contents extraction unit according to an embodiment of the present disclosure.

DETAILED DESCRIPTION

Figure 1:
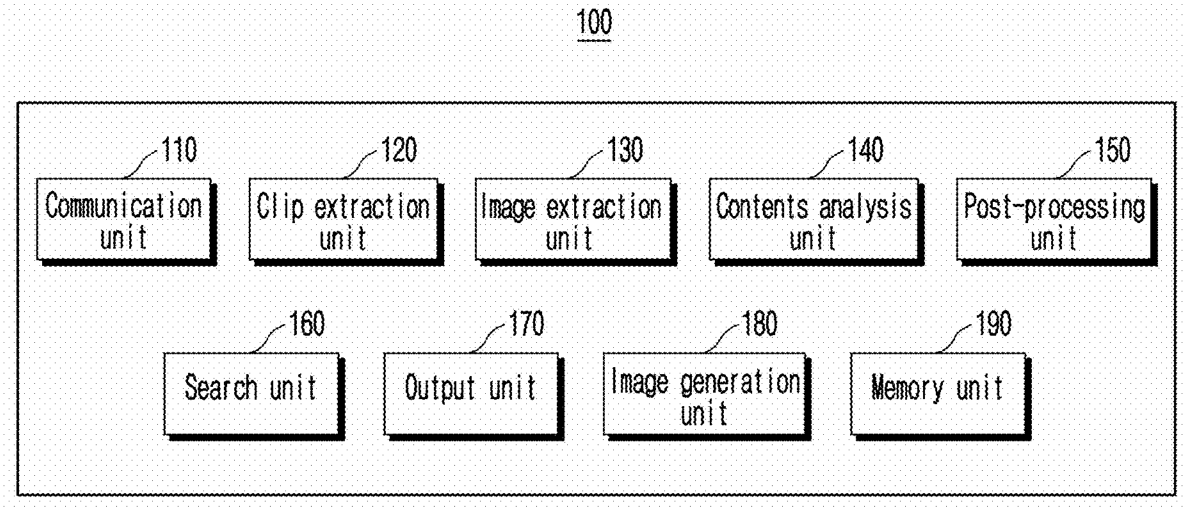
FIG. 1 is a plan view illustrating a construction of a video management apparatus that searches for the contents of a video according to an embodiment of the present disclosure.

The present disclosure may be changed in various ways and may have various embodiments. Specific embodiments are to be illustrated in the drawings and specifically described. It should be understood that the present disclosure is not intended to be limited to the specific embodiments, but includes all of changes, equivalents and/or substitutions included in the spirit and technical range of the present disclosure. Similar reference numerals are used for similar components while each drawing is described.

Terms, such as a first, a second, A, and B, may be used to describe various components, but the components should not be restricted by the terms. The terms are used to only distinguish one component from another component. For example, a first component may be referred to as a second component without departing from the scope of rights of the present disclosure. Likewise, a second component may be referred to as a first component. The term "and/or" includes a combination of a plurality of related and described items or any one of a plurality of related and described items.

When it is described that one component is "connected" or "coupled" to the other component, it should be understood that one component may be directly connected or coupled to the other component, but a third component may exist between the two components. In contrast, when it is described that one component is "directly connected to" or "directly coupled to" the other component, it should be understood that a third component does not exist between the two components.

Terms used in this application are used to only describe specific embodiments and are not intended to restrict the present disclosure. An expression of the singular number includes an expression of the plural number unless clearly defined otherwise in the context. In this specification, a term, such as "include" or "have", is intended to designate the presence of a characteristic, a number, a step, an operation, a component, a part or a combination of them, and should be understood that it does not exclude the existence or possible addition of one or more other characteristics, numbers, steps, operations, components, parts, or combinations of them in advance.

All terms used herein, including technical terms or scientific terms, have the same meanings as those commonly understood by a person having ordinary knowledge in the art to which the present disclosure pertains, unless defined otherwise in the specification.

Terms, such as those defined in commonly used dictionaries, should be construed as having the same meanings as those in the context of a related technology, and are not construed as ideal or excessively formal meanings unless explicitly defined otherwise in the application.

Furthermore, each construction, process, procedure, or method included in each embodiment of the present disclosure may be shared within a range in which the constructions, processes, procedures, or methods do not contradict each other technically.

FIG. 1 is a plan view illustrating a construction of a video management apparatus that searches for the contents of a video according to an embodiment of the present disclosure.

Referring to FIG. 1, a video management apparatus 100 according to an embodiment of the present disclosure includes a communication unit 110, a clip extraction unit 120, an image extraction unit 130, a contents analysis unit 140, a post-processing unit 150, a search unit 160, an output unit 170, an image generation unit 180, and a memory unit 190.

The video management apparatus 100 includes one or more processors configured to execute program modules. The one or more processors may include a central processing unit, a microprocessor, a multiprocessor, an integrated circuit, an application-specific integrated circuit (ASIC), and a field programmable gate array (FPGA), or any other computing device.

The communication unit 110, the clip extraction unit 120, the image extraction unit 130, the contents analysis unit 140, the post-processing unit 150, the search unit 160, the output unit 170, and the image generation unit 180 may be program modules to be executed by the one or more processors. The program modules may be included in the video management apparatus 100 in the form of operating systems, application program modules, and other program modules, while they may be physically stored in a variety of commonly known storage devices. Such program modules may include, but are not limited to, routines, subroutines, programs, objects, components, and data structures for performing specific tasks or executing specific abstract data types according to the invention as will be described below.

The memory unit 190 may comprise RAM, ROM, flash memories, hard drives, or any device capable of storing machine-readable and executable instructions such that the machine-readable and executable instructions can be accessed by the one or more processors.

The video management apparatus 100 classifies and extracts one or more clips from a received image and analyzes the contents of each of the clips. The video management apparatus 100 enables a user to directly search whether specific contents are included in an image and whether corresponding contents are present within the received image, identifies whether corresponding contents are included in what part if the corresponding contents are present within a received image, and outputs the corresponding contents. Moreover, the video management apparatus 100 outputs each of the extracted clips, and enables a user to select a clip to be extracted at his or her own convenience and to conveniently generate a new image that is implemented with only the selected clip. The video management apparatus 100 includes the components that perform operations to be described later, and can significantly reduce a data processing load while having accuracy that is similar to or a conventional video management better than that of apparatus.

The communication unit 110 receives a video from which each clip is to be extracted or the contents of which is to be analyzed from the outside. Furthermore, the communication unit 110 receives contents to be searched for within a video from the outside, and receives an input (i.e., an input to select clips that will be extracted as a new image) for generating a new image from the outside.

The clip extraction unit 120 classifies and extracts clips from the received video. The clip extraction unit 120 classifies the received video in each frame unit. The clip extraction unit 120 determines whether a change having a preset reference value or more has occurred in a pixel value or HSV (color, saturation, brightness) within each of the frames. The clip extraction unit 120 may determine the pixel value or HSV of all of the frames, and may classify all of the frames into a plurality of intervals for a more fine and accurate determination and determine the pixel value or HSV for each interval. If there is a difference having a preset reference value or more between the pixel values or HSVs in all of front and back frames or for each interval, the clip extraction unit 120 determines that a clip between front and back frames analyzed has been changed. The clip extraction unit 120 classifies, as one clip, frames from a next frame (or the first frame) of the last frame within a previous clip to the last frame a clip of which has been determined to be changed at current timing. The clip extraction unit 120 classifies and extracts clips under the condition. The clip extraction unit 120 classifies and extracts a received video as one or more clips as described above. The clips extracted by the clip extraction unit 120 are illustrated in FIG. 2.

Figure 2:
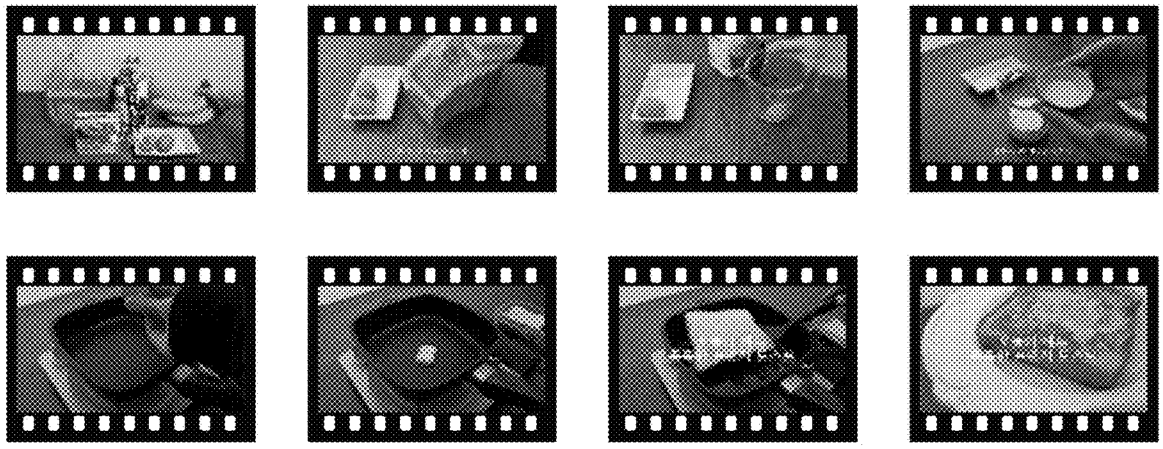
FIG. 2 is a diagram illustrating an example of clips extracted by a clip extraction unit according to an embodiment of the present disclosure.

FIG. 2 is a diagram illustrating an example of clips extracted by the clip extraction unit according to an embodiment of the present disclosure.

Referring to FIG. 2, the clip extraction unit 120 classifies, as a clip, timing before and after timing at which a change having a preset reference value or more has occurred in the pixel value or HSV of a frame within a video. Accordingly, the clip extraction unit 120 extracts at least one clip from the video.

Referring back to FIG. 1, the clip extraction unit 120 extracts a script from each of the extracted clips. The clip extraction unit 120 converts the extracted clips (e.g., a file having the mp4 format) into an audio file (e.g., a file having the mp3 format), and extracts text (i.e., a script) from the audio file. The clip extraction unit 120 may use a Whisper artificial intelligence model to extract the text from the clips.

The image extraction unit 130 extracts a preset number of representative images from each of the clips extracted by the clip extraction unit 120. In this case, the preset number may be 1, may be 10 or less, or may be 50% or less of the number of frames included in an extracted clip. The representative image may be extracted for each preset interval. For example, the image extraction unit 130 may extract the representative image one by one every second in extracting the representative image for each preset interval. If any one of the extracted clips is a total of 3 seconds, the image extraction unit 130 may extract a total of three representative images as the representative images of a corresponding clip by one representative image every second. The image extraction unit 130 may extract an image in an arbitrary interval, and may extract an image in a specific interval, for example, the first frame, an intermediate frame, or the last frame. The image extraction unit 130 extracts a preset number of representative images from each clip.

The contents analysis unit 140 analyzes the contents of each clip by using a representative image of each clip, which has been extracted by the image extraction unit 130, and/or the script of each clip extracted by the clip extraction unit 120. The contents analysis unit 140 analyzes the contents of each clip by using a representative image of each clip or the representative image of each clip and the script of each clip using an artificial intelligence learning model, such as a vision language model (VLM). A conventional video management apparatus analyzes the contents of the entire video by using the VLM in analyzing the content of a video. However, a video has a large amount of data from a viewpoint of a learning model, such as the VLM, because the video includes many frames (or images). Accordingly, when receiving a video as an input value, a corresponding learning model causes a loss of data in a process of outputting an output value (i.e., content analysis) by performing an operation, and also requires a significant computational load (or token). In contrast, the contents analysis unit 140 never generates a loss of data in a calculation process and can also significantly reduce a computational load (or token) compared to the conventional video management apparatus because the contents analysis unit 140 receives (a preset number of) representative images of each clip extracted by the image extraction unit 130 as an input value or receives a degree of script as an input value along with (the preset number of) representative images of each clip. Examples of operations of the clip extraction unit 120, the image extraction unit 130, and the contents analysis unit 140 are illustrated in FIGS. 3A and 3B.

FIGS. 3A and 3B are diagrams illustrating an example of extraction by the clip extraction unit, the image extraction unit, and the contents extraction unit according to an embodiment of the present disclosure.

As illustrated in FIG. 3A, a received video is classified into one or more clips by the clip extraction unit 120, and the script of each of the clips may be extracted along with the one or more clips. The image extraction unit 130 extracts a preset number of representative images (described as a thumbnail in FIG. 3A) from each of the extracted clips.

As illustrated in FIG. 3B, the contents analysis unit 140 analyzes the contents of the clips by using a representative image or a representative image and a script for each clip.

Referring back to FIG. 1, the post-processing unit 150 performs post-processing based on the extracted contents of the clip extraction unit 120, the image extraction unit 130, and the contents analysis unit 140. The post-processing unit 150 performs embedding on each clip so that the search unit 160 can perform search on the clips based on the extracted contents of the clip extraction unit 120, the image extraction unit 130, and the contents analysis unit 140. The post-processing unit 150 performs a multi-modal embedding process and post-processing on the clips, by using the representative image extracted by the image extraction unit 130, the contents analyzed by the contents analysis unit 140, and the script extracted by the clip extraction unit 120. Accordingly, the search unit 160 can easily search what contents a clip has and what script a clip has.

The search unit 160 searches the video, which is received by the communication unit 110 from the outside, for contents to be searched for. The search unit 160 performs embedding on the contents to be searched for within the video, which is received by the communication unit 110 from the outside. Thereafter, the search unit 160 searches the contents of each clip on which multi-modal embedding has been performed by the post-processing unit 150 for the contents on which the embedding has been performed. The search unit 160 searches for a clip having the highest similarity to the contents to be searched for or clips each having similarity to the contents to be searched for, which is greater than a preset reference value, based on a cosine similarity method. Accordingly, the search unit 160 searches the video received from the outside for the contents to be searched for within the video, and provides guidance to a clip or clips related to the contents to be searched for.

The output unit 170 outputs the clip extracted by the clip extraction unit 120, and may also output the extracted script or contents along with the clip. The output unit 170 may output the clips extracted by the clip extraction unit 120 from the video. A form in which the output unit 170 outputs the clips is illustrated in FIG. 4.

Figure 4:
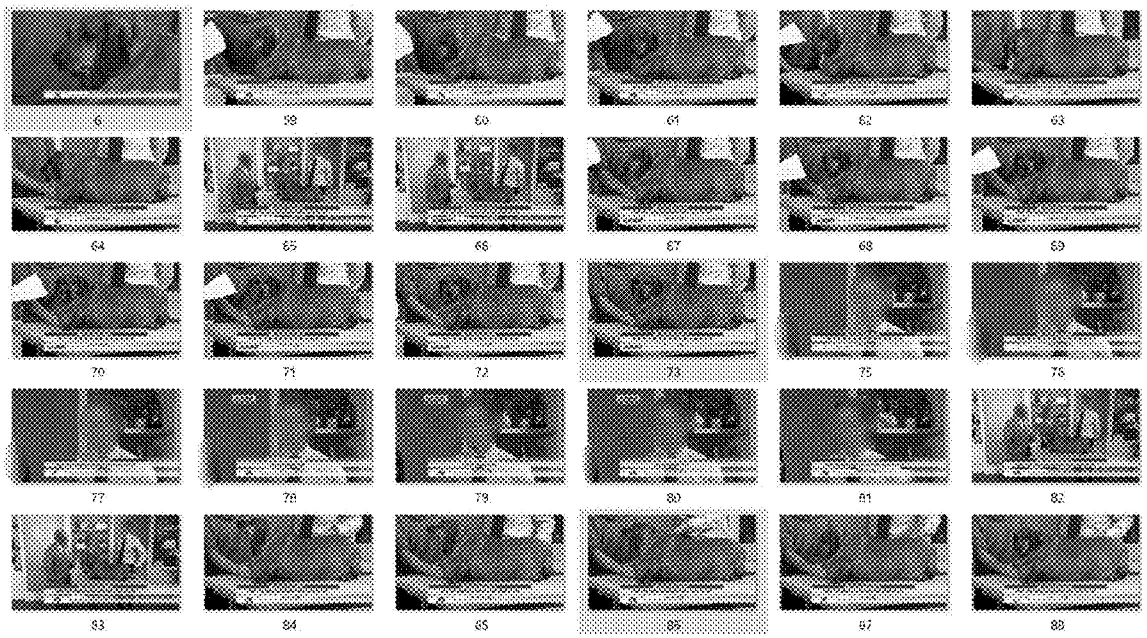
FIGS. 4 and 5 are diagrams illustrating examples of screens that are output by an output unit according to an embodiment of the present disclosure.
Figure 5:

FIGS. 4 and 5 are diagrams illustrating examples of screens that are output by the output unit according to an embodiment of the present disclosure.

Referring to FIG. 4, the output unit 170 outputs all of the clips or some clips extracted by the clip extraction unit 120 in a lump. Accordingly, a user of the video management apparatus 100 can consistently check the entire contents or a flow of the video that has been input in order to analyze or search the video. Moreover, the output unit 170 may output both the script and contents of the clips at one location. Accordingly, the output unit 170 enables a user of the video management apparatus 100 to check the contents of the clips more conveniently.

As illustrated in FIG. 5, in order to improve convenience of a user of the video management apparatus 100, the output unit 170 may highlight and output the clips (i.e., clips having constant similarity to the contents to be searched for within the video received from the outside) retrieved by the search unit 160.

Referring back to FIG. 1, the image generation unit 180 generates some of the clips within the video as a new image in response to an input for generating the new image, which is received by the communication unit 110 from the outside. The image generation unit 180 may operate as illustrated in FIG. 5.

Referring to FIG. 5, a user of the video management apparatus 100 may select (or input) desired clips depending on his or her convenience or purpose. When the communication unit 110 receives the input from the outside, the image generation unit 180 generates the selected clips as one new image again in response to the input. Accordingly, the user can conveniently generate some of the clips as an image according to his or her purpose again by only selecting the some of the clips that are output, without a need to generate a new video again from the received video.

Referring back to FIG. 1, the memory unit 190 stores data received by the communication unit 110 and information that is generated as the components 120 to 160 operate.

Figure 6:
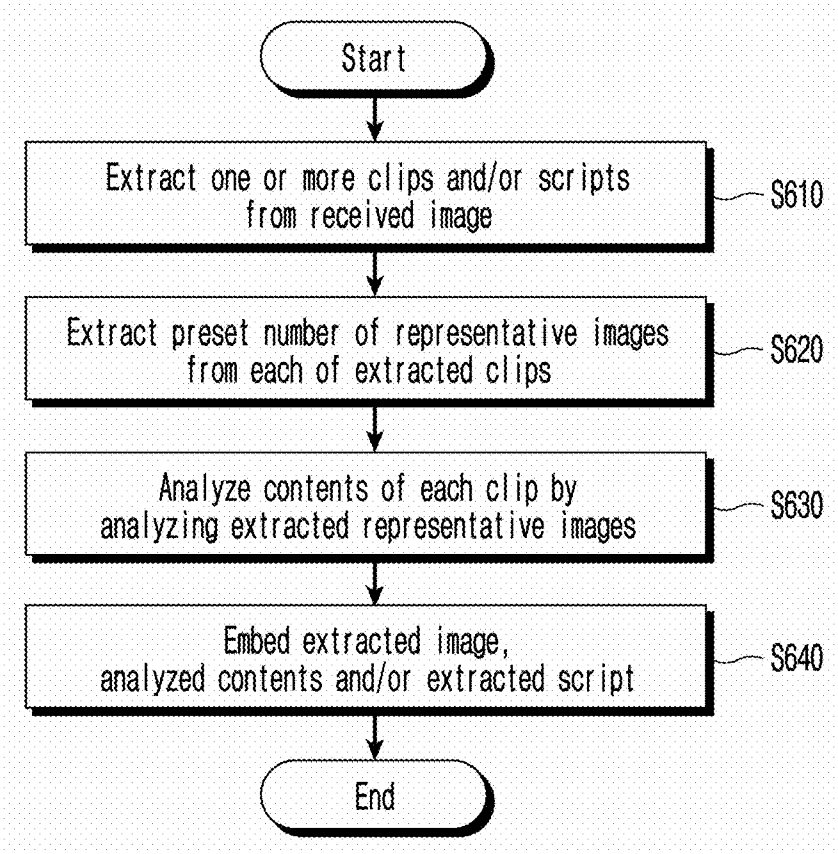
FIG. 6 is a flowchart illustrating a method of the video management apparatus extracting clips from a video and analyzing the contents of the clips according to an embodiment of the present disclosure.

FIG. 6 is a flowchart illustrating a method of the video management apparatus extracting clips from a video and analyzing the contents of the clips according to an embodiment of the present disclosure.

The clip extraction unit 120 extracts one or more clips and/or scripts from a received image (S610). When the communication unit 110 receives a video from which each clip is to be extracted or the contents of which are to be analyzed from the outside, the clip extraction unit 120 extracts one or more clips from the received image and may also extract a script from each clip.

The image extraction unit 130 extracts a preset number of representative images from each of the extracted clips (S620).

The contents analysis unit 140 analyzes the contents of each clip by analyzing the extracted representative images (S630). The contents analysis unit 140 analyzes the contents of each clip by using a representative image of each clip or the representative image of each clip and the script of each clip. The contents analysis unit 140 may use an artificial intelligence learning model, such as the VLM, in order to analyze the contents of each clip. Unlike in a conventional technology, the accuracy of analysis can be secured even with a significantly reduced computational load because the analysis is performed by using a representative image of each clip.

The post-processing unit 150 embeds the extracted image, the analyzed contents and/or the extracted script (S640). The post-processing unit 150 performs post-processing on the representative image extracted by the image extraction unit 130, the contents analyzed by the contents analysis unit 140, and the script extracted by the clip extraction unit 120 with respect to the clips through a multi-modal embedding process. The post-processing unit 150 enables the search unit 160 to perform search on the clips based on the extracted contents.

Figure 7:
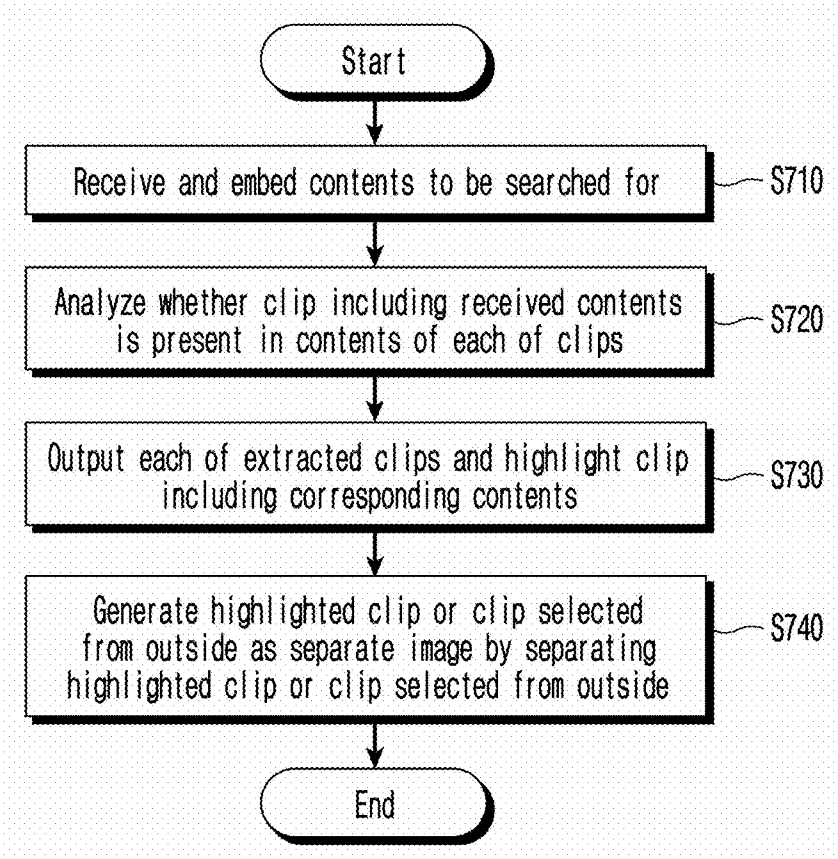
FIG. 7 is a flowchart illustrating a method of the video management apparatus searching a video for contents according to an embodiment of the present disclosure.

FIG. 7 is a flowchart illustrating a method of the video management apparatus searching a video for contents according to an embodiment of the present disclosure.

The search unit 160 receives and embeds contents to be searched for (S710). The search unit 160 receives the contents to be searched for within the video that has been received by the communication unit 110 from the outside. The search unit 160 embeds the contents for search.

The search unit 160 analyzes whether a clip including the received contents is present in the contents of each of clips (S720). The search unit 160 searches for a clip having the highest similarity or clips each having similarity greater than a preset reference value, by searching the contents of each clip on which multi-modal embedding has been performed by the post-processing unit 150 for the contents on which the embedding has been performed.

The output unit 170 outputs each of the extracted clips, and may highlight the clip having the contents to be searched for (S730). The output unit 170 may output the clips extracted from the video by arranging some or all of the extracted clips, and may output clips including the contents to be searched for by highlighting the clips.

The image generation unit 180 generates the highlighted clip or a clip selected from the outside as a separate image by separating the highlighted clip or the clip selected from the outside (S740).

Figure 8:
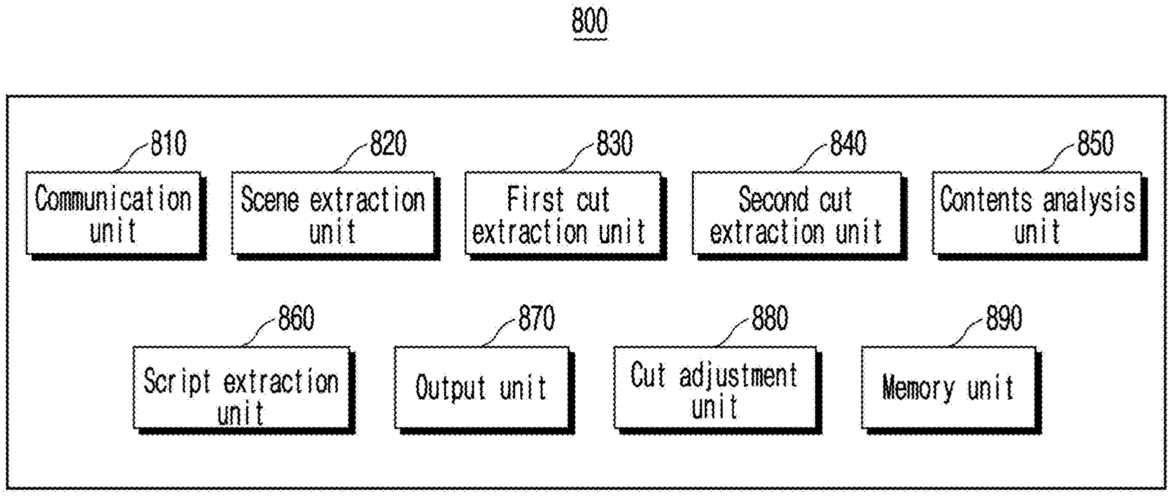
FIG. 8 is a diagram illustrating a construction of the video management apparatus that edits a video and extracts a cut according to an embodiment of the present disclosure.

FIG. 8 is a diagram illustrating a construction of the video management apparatus that edits a video and extracts a cut according to an embodiment of the present disclosure.

Referring to FIG. 8, the video management apparatus 100 according to an embodiment of the present disclosure includes a communication unit 810, a scene extraction unit 820, a first cut extraction unit 830, a second cut extraction unit 840, a contents analysis unit 850, a script extraction unit 860, an output unit 870, a cut adjustment unit 880, and a memory unit 890.

The video management apparatus 100 receives an arbitrary image, classifies and extracts a scene and a cut, and outputs the extracted scene and cut by combining the scene and cut with one screen. In this case, the scene is a concept in which the scene is classified depending on whether a background within the image is changed. The cut is a concept in which the cut is classified depending on whether an object within the image has been changed within the classified scene or whether the contents of a dialogue have been changed. That is, the received image may be classified into one or more scenes, and may be classified into one or more cuts within one scene. The video management apparatus 100 recognizes each scene and cut within the received image and classifies and extracts the scene and the cut. The video management apparatus 100 outputs the extracted scenes and cuts by combining the extracted scenes and cuts with one screen so that a device user (e.g., an image photographer or an image editor) can check all of the general contents or context of the image, timing at which a scene or the contents of a dialogue is changed within the image, and the contents of a dialogue that appear in the image in a lump. Moreover, the video management apparatus 100 enables the device user to select arbitrary cuts and to edit the contents or length of the arbitrary cuts, such as merging or splitting the arbitrary cuts. Accordingly, the video management apparatus 100 enables a device user to check the general contents or context of an image even without separate efforts, to check timing at which a scene or the contents of a dialogue are changed, and to edit the entire image or each of cuts at his or her own convenience.

The communication unit 810 receives an image from the outside (e.g., a terminal that is used by a device user), and receives a method of extracting a cut or an input for the editing of a cut. If the device user wants a specific cut extraction method, the communication unit 810 may receive a method of extracting a cut from the outside. Furthermore, if the device user wants to edit extracted cuts, the communication unit 810 may receive an input for the editing of the cuts.

The scene extraction unit 820 classifies and extracts scenes within the received image. The scene extraction unit 820 classifies the received image in a frame unit. The scene extraction unit 820 classifies an object and a background other than the object within each classified frame by using various extraction schemes. The scene extraction unit 820 classifies the object and the background in each frame within the image by using various methods, such as a method of extracting an object based on a color (color-based object extraction) by classifying the colors of objects and the color of a background, a method of extracting an object based on an edge (edge-based object extraction) by detecting an edge in an image, a method of extracting an object based on a shape (shape-based object extraction) by classify histogram information or a shape, or a method of extracting an object based on texture (texture-based object extraction) by analyzing texture characteristics of each object.

The scene extraction unit 820 classifies the object and background in each frame unit and determines whether a change having a preset reference value or more has occurred in a pixel value (RGB) or HSV (color, saturation, brightness) of the background other than the object. The scene extraction unit 820 may determine the pixel value or HSV of the entire background, but may classify the entire background into a plurality of intervals for a more fine and accurate determination and determine the pixel value or HSV for each interval. The scene extraction unit 820 determines whether there is a difference having a preset reference value or more between the pixel values or HSVs in all of front and rear frames that neighbor each other or for each interval. If there is a difference having the preset reference value or more between the pixel values or HSVs in both the front and rear frames that neighbor each other or for each interval, the scene extraction unit 820 determines that a scene has been changed between front and rear frames that have been analyzed. The scene extraction unit 820 classifies, as one scene, frames from a next frame (or the first frame) of the last frame within a previous scene to the last frame that has been determined to be changed at current timing. The scene extraction unit 820 classifies and extracts each scene under the condition. The scene extraction unit 820 classifies and extracts the image as one or more scenes in this way. The scenes extracted by the scene extraction unit 820 are illustrated in FIG. 9.

Figure 9:
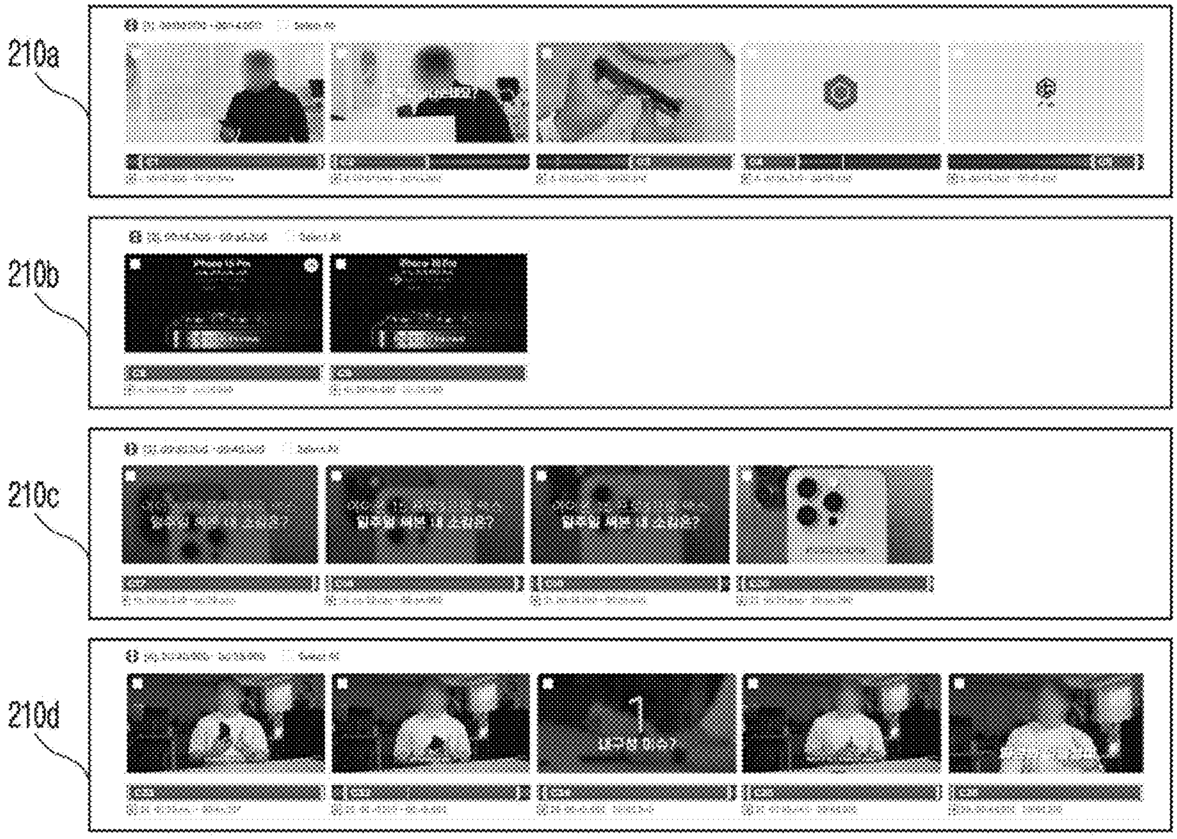
FIG. 9 is a diagram illustrating scenes that are extracted by the scene extraction unit according to an embodiment of the present disclosure.

FIG. 9 is a diagram illustrating scenes that are extracted by the scene extraction unit according to an embodiment of the present disclosure.

Referring to FIG. 9, as illustrated by 910*a* to 910*d*, the scene extraction unit 820 classifies, as a scene, timing before and after timing at which a change having a preset reference value or more occurs in the pixel value or HSV of a background within an image. Accordingly, the scene extraction unit 820 extracts at least one scene from the image.

Referring back to FIG. 8, the first cut extraction unit 830 classifies and extracts a cut based on a change of a pixel value or a change in the edge of an object in each frame within each scene.

The first cut extraction unit 830 classifies each of the frames as a plurality of intervals or analyzes the pixel value or HSV of a background with respect to unit pixels of the frames. The first cut extraction unit 830 calculates a difference between the pixel values or HSVs of the intervals or unit pixels of front and rear frames, and calculates an average value of the pixel values or HSVs. The first cut extraction unit 830 accumulates the average values of the front and rear frames, and determines whether an accumulated value of the average values has been changed to a preset reference value or more. If the accumulated value of the average values has been changed to the preset reference value or more, the first cut extraction unit 830 determines that a cut has been changed between the front and rear frames at timing at which the accumulated value has been changed to the preset reference value or more, and classifies both cuts as different cuts. If the cut has been classified, the first cut extraction unit 830 resets the accumulated average value to 0 again, accumulates the average values again, and classifies the cuts. At this time, when a time between a cut classified at previous timing and a cut classified at timing right after the previous timing is within a preset interval, the first cut extraction unit 830 does not classify both cuts as different cuts. For example, in a situation in which a preset interval is 5 seconds, if a cut classified at previous timing is disposed at a 3-second point within an image and a cut classified at timing after the previous timing is disposed at a 6-second point within the image, the first cut extraction unit 830 determines both cuts as one cut (having the same contents) without classifying the cuts as different cuts.

Alternatively, the first cut extraction unit 830 classifies and extracts cuts based on a change in the edge of an object within each frame. The first cut extraction unit 830 converts each of frames in a gray scale, removes basic noise, and then extracts the edge of an object within each frame by using various edge detection methods (e.g., a canny edge detector, a Sobel filter, or a Laplacian filter). The edge of the object is extracted in a binary image form. The first cut extraction unit 830 extracts the edge of the object with respect to each interval or each unit pixel between the frames, and calculates an average value of the edges. Likewise, the first cut extraction unit 830 accumulates the average values of front and rear frames, and determines whether an accumulated value of the average values has been changed to a preset reference value or more. Cuts that are extracted by the first cut extraction unit 830 are illustrated in FIG. 10.

Figure 10:
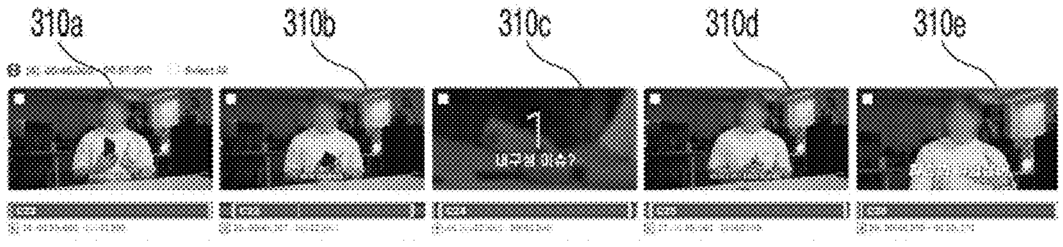
FIG. 10 is a diagram illustrating cuts that are extracted by a first cut extraction unit according to an embodiment of the present disclosure.

FIG. 10 is a diagram illustrating cuts that are extracted by a first cut extraction unit according to an embodiment of the present disclosure.

Referring to FIG. 10, the first cut extraction unit 830 classifies and extracts one or more cuts 1010*a* to 1010*e* within one scene based on a difference between the pixel values or HSVs of a background or a change in the edge of an object.

Referring back to FIG. 8, the second cut extraction unit 840 operates in parallel to the first cut extraction unit 830 or operates selectively with respect to the first cut extraction unit 830, and classifies and extracts cuts based on a change in the contents of a dialogue within each scene.

Unlike the first cut extraction unit 830, the second cut extraction unit 840 recognizes a voice within an image and classifies a cut based on the voice. The second cut extraction unit 840 recognizes a voice within an image by using a method of converting a voice within an image into text. In this case, for example, the Whisper artificial intelligence model may be used in the method of converting a voice into text. The Whisper artificial intelligence model receives voice data and extracts acoustic features by analyzing a frequency, intensity, or a temporal change within the voice data. Thereafter, Whisper artificial intelligence model recognizes features, such as a language or pronunciation, from the extracted acoustic features, and converts the features into text. However, the second cut extraction unit 840 is not limited to the use of only the Whisper artificial intelligence model, and may use any method or artificial intelligence model if a voice within an image can be converted into text.

The second cut extraction unit 840 converts a voice within an image into text by using the aforementioned method. The second cut extraction unit 840 recognizes a change in the contents of a dialogue based on the converted text. A change in the contents of the dialogue may include a case in which a sentence is concluded as "다" or "까" in Korean or a case in which the respiration of a speaker is stopped. When a sentence is concluded or the respiration of a speaker is stopped based on text as described above, the second cut extraction unit 840 considers a change to have occurred in the contents of a dialogue and classifies and extracts corresponding timing as a cut. Cuts that are extracted by the second cut extraction unit 840 are illustrated in FIG. 11.

Figure 11:
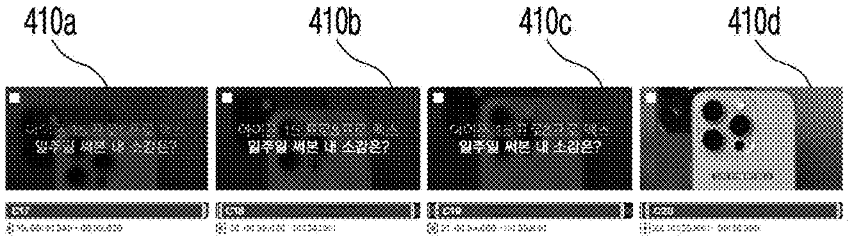
FIG. 11 is a diagram illustrating cuts that are extracted by the first cut extraction unit according to an embodiment of the present disclosure.

FIG. 11 is a diagram illustrating cuts that are extracted by the first cut extraction unit according to an embodiment of the present disclosure.

Referring to FIG. 11, the second cut extraction unit 840 classifies and extracts one or more cuts 1110*a* to 1110*d* within one scene based on a change in the contents of a dialogue.

Referring back to FIG. 8, when the communication unit 810 receives a cut extraction method desired by a device user, a cut extraction unit that complies with the cut extraction method operates or the cut extraction unit operates in a way in which the cut extraction unit complies with the cut extraction method. If a device user wants to classify a cut by using the first cut extraction unit 830, for example, a method using a difference value between the pixel values or HSVs of unit pixels, the first cut extraction unit 830 operates in a corresponding way. Alternatively, if a device user wants only the second cut extraction unit 840 to operate or wants the first cut extraction unit 830 to extract a cut based on the contents of a dialogue along with the second cut extraction unit 840, the cut extraction unit operates in response thereto.

The contents analysis unit 850 analyzes schematic contents of a scene that is extracted by the scene extraction unit 820. The contents analysis unit 850 checks cuts within each scene that is extracted by the first cut extraction unit 830 or the second cut extraction unit 840 with respect to each scene that is extracted by the scene extraction unit 820. The contents analysis unit 850 extracts arbitrary frames (or an image) with respect to each of cuts within each scene to be analyzed. For example, the contents analysis unit 850 may extract the first frames with respect to each of cuts. The contents analysis unit 850 analyzes the contents of an image with respect to frames extracted from each of cuts. The contents analysis unit 850 analyzes the contents of one frame of each of cuts included in a scene to be analyzed by using an artificial intelligence learning model that analyzes an image, such as large multimodal models (LMMs). The contents analysis unit 850 analyzes the contents of each of cuts included in a scene to be analyzed, and analyze the schematic contents of the entire scene by combining the analyzed contents.

The script extraction unit 860 extracts the script of each of scenes or cuts. The script extraction unit 860 converts each of scenes extracted by the scene extraction unit 820 or cuts (e.g., an image, for example, a file having the mp4 format) extracted by each of the first and second cut extraction units 830 and 840 into an audio file (e.g., a file having the mp3 format), and extracts text (i.e., a script) from the audio file. The aforementioned artificial intelligence model may be used in the method of extracting text. The script extraction unit 860 may extract a script from each of cuts by matching pieces of timing of a corresponding script within an image with the script.

The output unit 870 outputs contents that are extracted or analyzed by the scene extraction unit 820, the first cut extraction unit 830 and/or the second cut extraction unit 840, the contents analysis unit 850, and the script extraction unit 860 in a lump. An example of a screen that is output by the output unit 870 is illustrated in FIG. 12 or 13.

Figure 12:
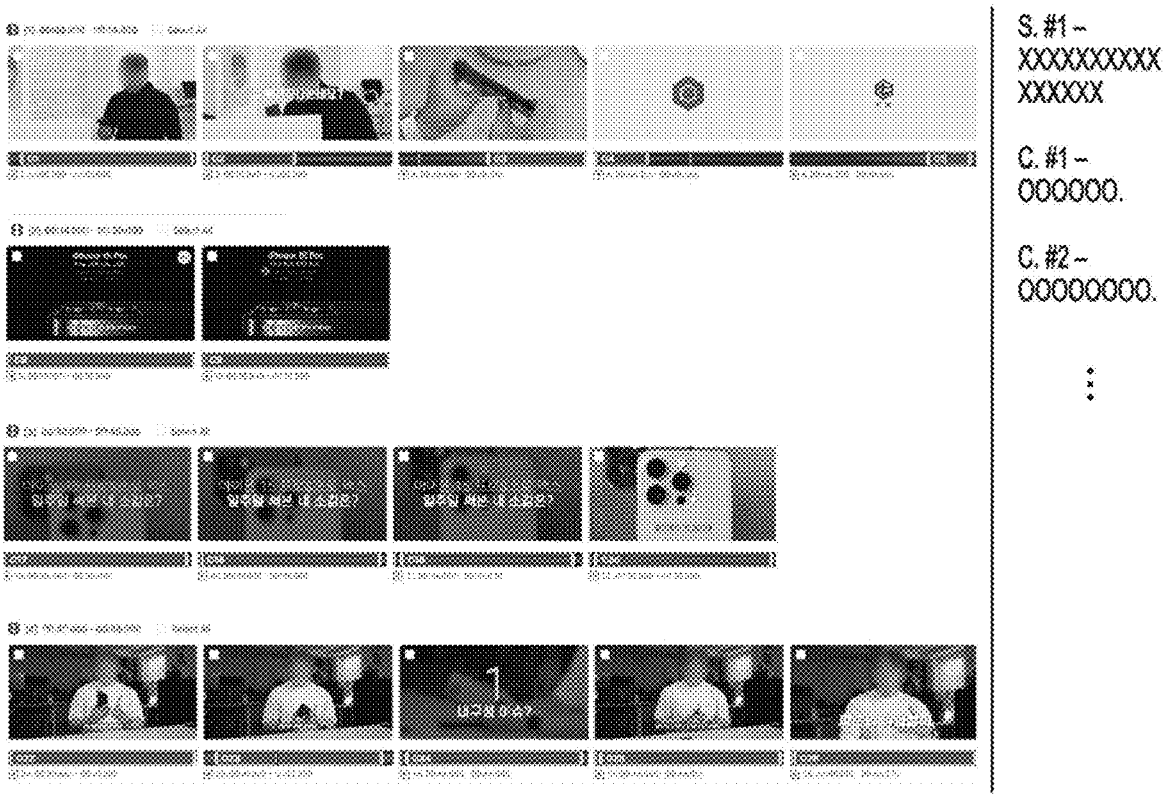
FIG. 12 is a diagram illustrating a result screen that is output by the output unit according to a first embodiment of the present disclosure.
Figure 13:
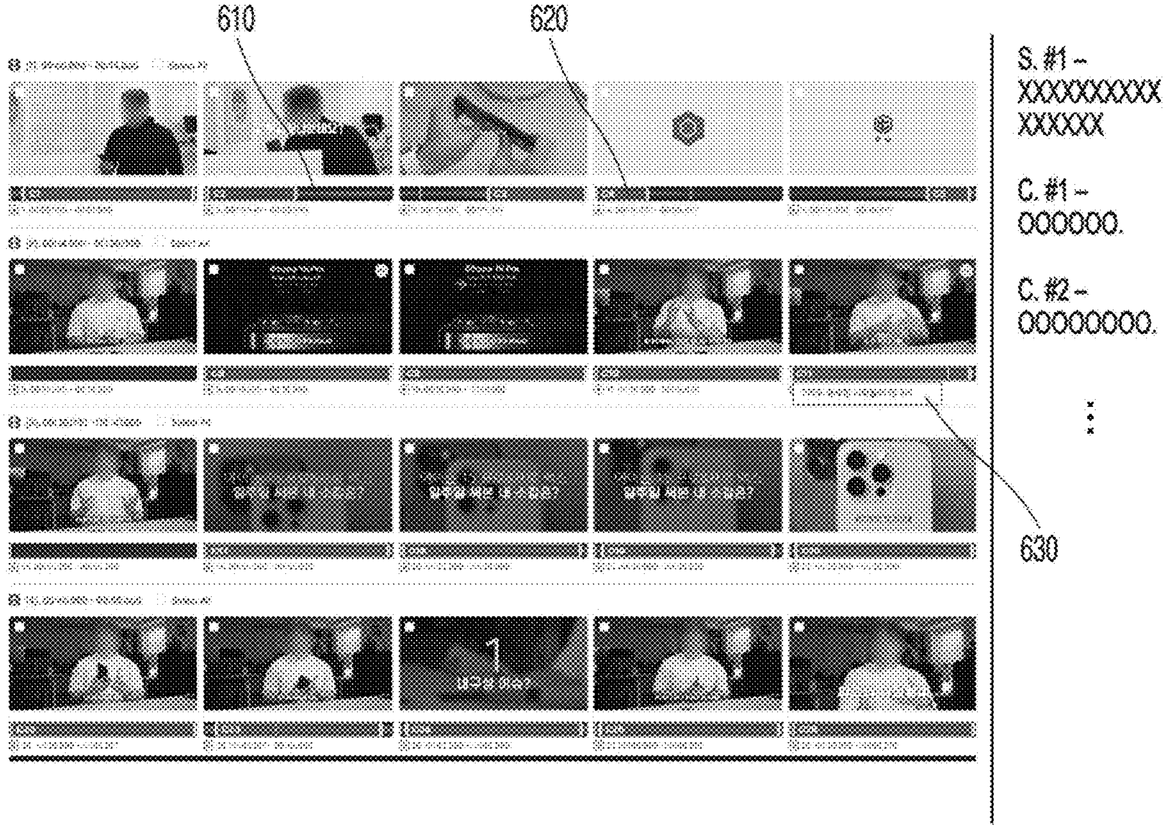
FIG. 13 is a diagram illustrating a result screen that is output by the output unit according to a second embodiment of the present disclosure.

FIG. 12 is a diagram illustrating a result screen that is output by the output unit according to a first embodiment of the present disclosure.

Referring to FIG. 12, the output unit 870 outputs scenes and cuts extracted by the scene extraction unit 820, the first cut extraction unit 830 and/or the second cut extraction unit 840. The output unit 870 classifies the scenes, also classifies cuts output from each scene, and outputs the cuts. That is, the output unit 870 classifies and outputs all of images as scenes and cuts (or images) within each scene. Accordingly, a device user can check the entire scene of an image and cuts included in each scene in a lump.

Furthermore, the output unit 870 outputs contents analyzed by the contents analysis unit 850 and scripts of each cut extracted by the script extraction unit 860 on one side thereof. Accordingly, a device user can check what each of scenes within an image delivers in a lump, and can also check what kind of a script each of cuts within each scene delivers.

FIG. 13 is a diagram illustrating a result screen that is output by the output unit according to a second embodiment of the present disclosure.

Moreover, as illustrated in FIG. 13, the output unit 870 may output each of cuts along with pieces of timing of a script extracted by the script extraction unit 860. That is, the output unit 870 may output each of the cuts by classifying timing 1310 at which a script is not present on one side (e.g., the bottom) of each cut and timing 1320 at which a script is present. Furthermore, if a device user wants to play back the script that is present at the timing 1320 or check the timing 1320 at which the script is present, the output unit 870 may output a script 1330 at the timing 1320 along with the timing 1320.

The output unit 870 outputs each of cuts included in each scene as an image by encoding each cut from a received image by only the interval of each cut. If each of the cuts is output as a full image not an encoded image, a device that is used by a device user requires a large capacity of memory. In order to prevent such a problem, the output unit 870 outputs each of cuts as an encoded image by encoding each cut. However, a predetermined time is taken to encode an image. If the number of cuts is increased depending on the size or length of an image, the time taken to encode the image may be greatly increased.

In order to prevent such a problem, the output unit 870 does not output all of cuts in a lump by encoding the cuts in outputting each scene and each of the cuts included in each scene, but preferentially encodes and outputs only the number of cuts which may be checked by a terminal that is used by a device user at once. For example, as illustrated in FIG. 13, if a total of 20 cuts are present in an image, when a terminal that is used by a device user can check only a total of 5 cuts in a lump, the output unit 870 does not encode and output the 20 cuts in a lump, but preferentially encodes only 5 cuts that are checked by the device user through the terminal and outputs the 5 cuts. Thereafter, if the device user wants to check other cuts, the output unit 870 additionally encodes and outputs corresponding cuts. Accordingly, the output unit 870 can secure real-time in outputting a scene and a cut, and may not cause an excessive load (attributable to the use of memory) for a terminal that is used by a device user.

Referring back to FIG. 8, the cut adjustment unit 880 adjusts and edits cuts in response to an input for the editing of a cut, which is received by the communication unit 810. A device user may want only the cuts 1010*b* to 1010*d* to be displayed within a corresponding scene, among the cuts illustrated in FIG. 10, may want the cut 1010*c* to be additionally separated and displayed as two or more cuts within a corresponding scene, and may want a part of the cut 1010*b* and the cut 1010*c* to be displayed within a corresponding scene. When the communication unit 810 receives an input for the editing of cuts from the outside (basically a terminal that is used by a device user) as described above, the cut adjustment unit 880 adjusts and edits the cuts in response to the input. The cut adjustment unit 880 may combine a plurality of cuts, may split an arbitrary cut into two cuts or more, and may simultaneously combine a plurality of cuts and split an arbitrary cut into two cuts or more. That is, the cut adjustment unit 880 may split any one or one or more cuts and then combine some of the split cuts or combine the some of the split cuts with other (not-split) cuts. The cut adjustment unit 880 adjusts and edits cuts in response to a received input, so that convenience of a device user can be significantly improved.

The memory unit 890 stores data that are received by the communication unit 810 and information that is extracted analyzed by each of the scene extraction unit 820, the first cut extraction unit 830, the second cut extraction unit 840, the contents analysis unit 850, and the script extraction unit 860. Accordingly, the memory unit 890 may enable the output unit 870 to output a scene, a cut, contents, and a script as described above, and may enable the cut adjustment unit 880 to adjust and edit cuts in response to a received input.

The video management apparatus 100 may be all types of mobile devices, such as a wearable device. The video management apparatus 100 may include a controller, an integrated circuit, a microchip, a computer, or a central processing unit that is implemented with other computing device.

The video management apparatus 100 may include a memory module. The memory module may include RAM, ROM, flash memory, a hard drive, or a device capable of storing a machine-readable and executable instruction, which may be accessed by a central processing unit.

The memory module may store an instruction indicated by the central processing unit so that each of the components within the video management apparatus 100 performs the aforementioned operation when the central processing unit operates.

The instruction may include one or more logic or algorithms that are written in any programming language. For example, a machine language may be directly executed by a processor. An assembly language, an object-oriented programming (OOP) language, a script language, and a microcode may be compiled or assembled as a machine-readable and executable instruction and stored in the memory module. Alternatively, the machine-readable and executable instruction may be written in a hardware description language (HDL), for example, like logic that is implemented through a field programming array (FPGA) component or an application-specific integrated circuit (ASIC).

The processes in FIGS. 6 and 7 have been described as being sequentially executed, but this merely illustrates the technology spirit of an embodiment of the present disclosure. In other words, a person having ordinary knowledge in the art to which an embodiment of the present disclosure pertains may variously modify and change the processes by changing and executing the sequence described in each of FIGS. 6 and 7 or executing one or more of the processes in parallel within a range that does not deviate from the intrinsic characteristic of an embodiment of the present disclosure. Accordingly, FIGS. 6 and 7 are not limited to the time-series sequence.

The processes illustrated in FIGS. 6 and 7 may be implemented in a computer-readable recording medium in the form of a computer-readable code. The computer-readable recording medium includes all types of recording devices in which data readable by a computer system is stored. That is, the computer-readable recording medium includes storage media, such as magnetic storage media (e.g., ROM, a floppy disk, and a hard disk) and optical reading media (e.g., CD-ROM and a DVD). Furthermore, the computer-readable recording medium may be distributed to computer systems connected over a network, and the computer-readable code may be stored and executed in a distributed manner.

The above description is merely a description of the technical spirit of the present embodiment, and those skilled in the art may change and modify the present embodiment in various without ways departing from the essential characteristic of the present embodiment. Accordingly, the embodiments should not be construed as limiting the technical spirit of the present embodiment, but should be construed as describing the technical spirit of the present embodiment. The technical spirit of the present embodiment is not restricted by the embodiments. The range of protection of the present embodiment should be construed based on the following claims, and all of technical spirits within an equivalent range of the present embodiment should be construed as being included in the scope of rights of the present embodiment.

What is claimed is:

1. A video management apparatus comprising:

a communication unit configured to receive an image from an outside;

a scene extraction unit configured to classify and extract scenes within the received image;

a first cut extraction unit configured to classify and extract cuts based on a change in a pixel value or a change in an edge of an object in each frame within each of the scenes extracted by the scene extraction unit;

a contents analysis configured to analyze contents of the scene extracted by the scene extraction unit;

a script extraction unit configured to extract a script of one or more of the scenes extracted by the scene extraction unit or one or more of the cuts extracted by the first cut extraction unit;

an output unit configured to output contents extracted or analyzed by the scene extraction unit, the first cut extraction unit, the contents analysis unit, and the script extraction unit in a lump; and a memory unit configured to store data received by the communication unit and information extracted or analyzed by each of the scene extraction unit, the first cut extraction unit, and the script extraction unit or the contents analysis unit.

2. The video management apparatus of claim 1, wherein the scene extraction unit classifies the received image in each frame unit and classifies a background other than the object within each of the frames.

3. The video management apparatus of claim 2, wherein the scene extraction unit determines whether the scene has been changed based on whether a change having a preset reference value or more has occurred in a pixel value (RGB) or HSV (color, saturation, brightness) of the background between front and rear frames.

4. The video management apparatus of claim 1, further comprising a second cut extraction unit configured to classify and extract the cuts based on a change in contents of a dialogue within each scene.

5. The video management apparatus of claim 4, wherein the second cut extraction unit operates in parallel to the first cut extraction unit or operates selectively with respect to the first cut extraction unit.

6. The video management apparatus of claim 4, wherein the second cut extraction unit converts a voice within the image into text and recognizes the change in the contents of a dialogue within each of the scenes.

7. The video management apparatus of claim 6, wherein the second cut extraction unit recognizes that the contents of the dialogue have been changed when a sentence is concluded or a respiration of a speaker is stopped.

8. The video management apparatus of claim 1, wherein the contents analysis unit extracts each of arbitrary frames with respect to each of the cuts within each scene to be analyzed.

9. The video management apparatus of claim 8, wherein the contents analysis unit analyzes contents of an image with respect to the extracted frames by using an artificial intelligence learning model that analyzes an image.

10. The video management apparatus of claim 1, wherein the script extraction unit converts each of the extracted cuts into an audio file and extracts the script from the audio file.

* * * * *